United States Patent
Zegveld et al.

(10) Patent No.: US 12,202,311 B2
(45) Date of Patent: Jan. 21, 2025

(54) END MEMBER ASSEMBLIES AS WELL AS GAS SPRING AND DAMPER ASSEMBLIES INCLUDING SAME

(71) Applicant: Firestone Industrial Products Company, LLC

(72) Inventors: Rutger Zegveld, Arnhem (NL); Joseph A. Bounds, Hermitage, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 18/554,476

(22) PCT Filed: Mar. 30, 2022

(86) PCT No.: PCT/US2022/022691
§ 371 (c)(1),
(2) Date: Oct. 8, 2023

(87) PCT Pub. No.: WO2022/212609
PCT Pub. Date: Oct. 6, 2022

(65) Prior Publication Data
US 2024/0083210 A1     Mar. 14, 2024

Related U.S. Application Data

(60) Provisional application No. 63/169,206, filed on Mar. 31, 2021.

(51) Int. Cl.
*B60G 17/052* (2006.01)
*B60G 11/27* (2006.01)
*B60G 13/00* (2006.01)

(52) U.S. Cl.
CPC .......... *B60G 17/0521* (2013.01); *B60G 11/27* (2013.01); *B60G 13/003* (2013.01);
(Continued)

(58) Field of Classification Search
CPC .... B60G 15/067; B60G 15/068; B60G 11/28; B60G 2204/4602; B60G 13/003;
(Continued)

(56) References Cited

U.S. PATENT DOCUMENTS

RE31,212 E  *  4/1983  Smith .................. F16F 9/18
                                              280/124.147
4,934,667 A *  6/1990  Pees .................... F16F 9/084
                                              188/322.18

(Continued)

FOREIGN PATENT DOCUMENTS

CN       104583640 A    4/2015
CN       106662186 A    5/2017
(Continued)

OTHER PUBLICATIONS

International Search Report and Written Opinion dated Jul. 8, 2022 issued by EPO in connection with corresponding International Application No. PCT/US2022/022691.
(Continued)

*Primary Examiner* — Timothy Wilhelm
(74) *Attorney, Agent, or Firm* — Thomas R. Kingsbury; Matthew P. Dugan

(57) ABSTRACT

End member assemblies include a first end member and a second end member. The first end member includes a first end member wall with a first side wall portion and a first flange wall portion. The first flange wall portion includes a plurality of attachment passages extending therethrough. The second end member includes a second end member wall with a second side wall portion and a second flange wall portion. The second end member includes attachment studs disposed along the second flange wall portion. The first and second end members are positioned axially coextensive with one another with the attachment studs extending through corresponding attachment passages. A stud head is unitarily
(Continued)

formed along the attachment studs with the stud head abuttingly engaging the first flange wall portion thereby retaining the first and second end members in an assembled condition.

20 Claims, 9 Drawing Sheets

(52) U.S. Cl.
CPC .... *B60G 2202/152* (2013.01); *B60G 2202/24* (2013.01); *B60G 2204/128* (2013.01); *B60G 2204/41* (2013.01); *B60G 2204/44* (2013.01); *B60G 2204/4404* (2013.01); *B60G 2204/45* (2013.01); *B60G 2206/91* (2013.01)

(58) Field of Classification Search
CPC ............... B60G 11/27; B60G 2202/24; B60G 2204/128; B60G 2204/44
See application file for complete search history.

(56) References Cited

U.S. PATENT DOCUMENTS

| | | | | |
|---|---|---|---|---|
| 5,172,999 A * | 12/1992 | Ijima | .................... | B60G 15/063 267/221 |
| 5,375,870 A * | 12/1994 | Smith | .................. | B60G 15/067 280/124.109 |
| 5,383,987 A * | 1/1995 | Kreis | ..................... | B62D 27/06 156/244.11 |
| 5,467,971 A * | 11/1995 | Hurtubise | ............ | B60G 15/068 280/124.147 |
| 6,260,835 B1 * | 7/2001 | Angles | ................. | B60G 13/005 188/321.11 |
| 6,592,112 B2 * | 7/2003 | Bishop | ...................... | F16F 9/54 188/321.11 |
| 6,764,066 B2 * | 7/2004 | Graeve | ................ | B60G 13/003 267/293 |
| 6,776,402 B2 * | 8/2004 | Miyamoto | ........... | B60G 13/003 267/140.3 |
| 7,284,644 B2 * | 10/2007 | Cmich | ................... | B60G 13/10 267/293 |
| 7,311,181 B2 * | 12/2007 | Germano | ............. | B60G 15/068 280/124.147 |
| 8,814,188 B2 * | 8/2014 | Anh | ...................... | B62D 25/088 267/220 |
| 9,039,020 B2 * | 5/2015 | Ratz | .......................... | F16F 9/05 267/64.19 |
| 9,440,524 B2 | 9/2016 | Farjoud et al. | | |
| 9,522,585 B2 * | 12/2016 | Jang | ...................... | F16C 35/067 |
| 9,701,170 B2 * | 7/2017 | DeBruler | ............. | F16F 13/002 |
| 9,770,958 B2 * | 9/2017 | Leonard | ................ | F16F 9/0472 |
| 9,975,390 B2 * | 5/2018 | Fox | ...................... | B60G 15/068 |
| 10,113,603 B2 * | 10/2018 | Smith | .................... | B60G 15/12 |
| 10,161,470 B2 | 12/2018 | Leonard | | |
| 11,584,180 B2 * | 2/2023 | Song | ................... | B29C 66/8322 |
| 11,802,604 B2 | 10/2023 | Van Aartsen et al. | | |
| 2019/0162229 A1 * | 5/2019 | Hamrodi | ................ | F16C 17/04 |
| 2020/0062062 A1 * | 2/2020 | Jeong | ................... | B60G 15/067 |
| 2020/0406515 A1 * | 12/2020 | Lim | ....................... | B60G 15/04 |
| 2022/0332160 A1 * | 10/2022 | Jeong | ................... | B60G 15/068 |
| 2023/0048082 A1 * | 2/2023 | Lauzon | ................. | B60G 15/12 |
| 2023/0056209 A1 * | 2/2023 | Oh | ........................ | B60G 15/068 |

FOREIGN PATENT DOCUMENTS

| | | |
|---|---|---|
| CN | 103330229 A | 8/2021 |
| WO | WO-2020/102298 A1 | 5/2020 |

OTHER PUBLICATIONS

Chinese Office Action and Search Report issued by CNIPA on Jan. 29, 2024 in connection with corresponding Chinese Patent Application No. 202280023283.4, and English language translation of thereof.

Chinese Office Action issued by CNIPA on Jun. 20, 2024 in connection with corresponding Chinese Patent Application No. 202280023283.4, and English language translation of thereof.

* cited by examiner

END MEMBER ASSEMBLIES AS WELL AS GAS SPRING AND DAMPER ASSEMBLIES INCLUDING SAME

This application is the National Stage of International Application No. PCT/US2022/022691, filed on Mar. 30, 2022, which claims the benefit of priority from U.S. Provisional Patent Application No. 63/169,206, filed on Mar. 31, 2021, the entire contents of which is hereby incorporated herein by reference.

BACKGROUND

The subject matter of the present disclosure broadly relates to the art of gas spring devices and, more particularly, to end member assemblies for gas spring and damper assemblies. The end member assemblies can include two or more end member components that are assembled in axially-fixed relation to one another. Gas spring and damper assemblies including one or more of such end members assemblies and suspension systems including one or more of such gas spring and damper assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring devices function to accommodate forces and loads associated with the operation and use of the vehicle. In some cases, the plurality of spring devices can take the form of gas spring assemblies that utilize pressurized gas as the working medium. Gas spring assemblies of various types, kinds and constructions are well known and commonly used. Typical gas spring assemblies can include a flexible spring member that is secured between comparatively rigid end members and/or end member assemblies. The end members and/or end member assemblies are fixedly secured to a flexible spring member (e.g., a convoluted bellows or an elongated flexible sleeve) such that a substantially fluid-tight spring chamber is formed within the gas spring assembly.

The plurality of damping devices are operative to dissipate energy associated with undesired inputs to and movements of the sprung mass, such as road inputs occurring under dynamic operation of a vehicle, for example. Typically, such dampers are liquid filled and operatively connected between a sprung mass and an unsprung mass, such as between a body and an axle of a vehicle, for example. One example of such damping components are conventional shock absorbers that are commonly used in vehicle suspension systems. Irrespective of the type and/or kind of working medium that is used in the damping devices, one of the damping devices can, in some cases, be coextensively engaged with a corresponding one of the gas springs to form so-called gas spring and damper assemblies.

Notwithstanding the overall success of known constructions, the foregoing and/or other disadvantages may still exist that could be limiting to broader adoption and/or use of gas spring and damper assemblies in connection with vehicular and/or other applications. Accordingly, it is believed desirable to develop constructions that may aid in overcoming the foregoing and/or other problems and/or disadvantages of known designs, and/or otherwise advance the art of vehicle suspension systems and/or components thereof.

BRIEF DESCRIPTION

One example of an end member assembly in accordance with the subject matter of the present disclosure can have a longitudinal axis and can be dimensioned for securement to an associated flexible spring member. The end member assembly can include a first end member and a second end member. The first end member can include a first end member wall that can include a first side wall portion extending peripherally about the longitudinal axis and a first flange wall portion extending radially outward from along the first side wall portion. The first flange wall portion can include a first first flange surface portion and a second first flange surface portion facing opposite the first first flange surface portion. The first flange wall portion can include a plurality of attachment passages extending therethrough and disposed in peripherally-spaced relation to one another about the longitudinal axis. The second end member can include a second end member wall with a second side wall portion extending peripherally about the longitudinal axis and a second flange wall portion extending radially outward from along the second side wall portion. The second flange wall portion can include a first second flange surface portion. The second end member can include a plurality of attachment studs disposed along the second flange wall portion in peripherally-spaced relation to one another about the longitudinal axis. The plurality of attachment studs can project axially from the first second flange surface portion. The first and second end members can be positioned axially coextensive with one another such that the first first flange surface portion and the second first flange surface portion are disposed in facing relation to one another. At least one of the plurality of attachment studs can extend through a corresponding one of the plurality of attachment passages and beyond the second first flange surface portion. A stud head can be unitarily formed along the at least one of the plurality of attachment studs with the stud head abuttingly engaging the second first flange surface portion of the first flange wall portion thereby retaining the first and second end members in an assembled condition.

One example of a gas spring and damper assembly in accordance with the subject matter of the present disclosure can include a damper assembly having a longitudinally-extending axis and a gas spring assembly disposed in axially coextensive relation with at least a portion of the damper assembly. The damper assembly can include a damper housing with a housing wall extending axially between opposing first and second ends. The housing wall can at least partially define a damping chamber containing a quantity of damping fluid. A damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially-outwardly from the first end of the damper housing. The gas spring assembly can include a flexible spring member extending peripherally about the longitudinal axis and longitudinally between opposing first and second ends such that a spring chamber is at least partially defined therebetween. A first end member assembly according to the foregoing paragraph can be operatively connected to the elongated damper rod and operatively secured across the first end of the flexible spring member such that a substantially fluid-tight connection is formed therebetween. A second end member assembly can be supported on the damper housing and operatively secured across the second end of the flexible spring member such that a substantially fluid-tight connection is formed therebetween.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of the spring chamber.

One example of a method in accordance with the subject matter of the present disclosure of include manufacturing an end member assembly that is dimensioned for securement to an associated flexible spring member. The method can include providing a first end member with a first end member wall. The first end member wall can include a first side wall portion extending peripherally about the longitudinal axis and a first flange wall portion extending radially outward from along the first side wall portion. The first flange wall portion can include a first first flange surface portion and a second first flange surface portion facing opposite the first first flange surface portion. The first flange wall portion can include a plurality of attachment passages extending therethrough that are disposed in peripherally-spaced relation to one another about the longitudinal axis. The method also includes providing a second end member with a second end member wall. The second end member wall includes a second side wall portion extending peripherally about the longitudinal axis and a second flange wall portion extending radially outward from along the second side wall portion. The second flange wall portion can include a first second flange surface portion. The second end member can also include a plurality of attachment studs disposed along the second flange wall portion in peripherally-spaced relation to one another about the longitudinal axis. The plurality of attachment studs can project axially from the first second flange surface portion. The method further includes positioning the first and second end members axially coextensive with one another such that the first first flange surface portion and the second first flange surface portion are disposed in facing relation to one another. In such an arrangement, at least one of the plurality of attachment studs extends through a corresponding one of the plurality of attachment passages and beyond the second first flange surface portion. The method further includes forming a stud head unitarily along the at least one of the plurality of attachment studs opposite the second flange wall portion such that the stud head abuttingly engages the second first flange surface portion of the first flange wall portion thereby retaining the first and second end members in an assembled condition.

DETAILED DESCRIPTION

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or elements may be exaggerated for purposes of clarity and/or ease of understanding.

Figure 1:
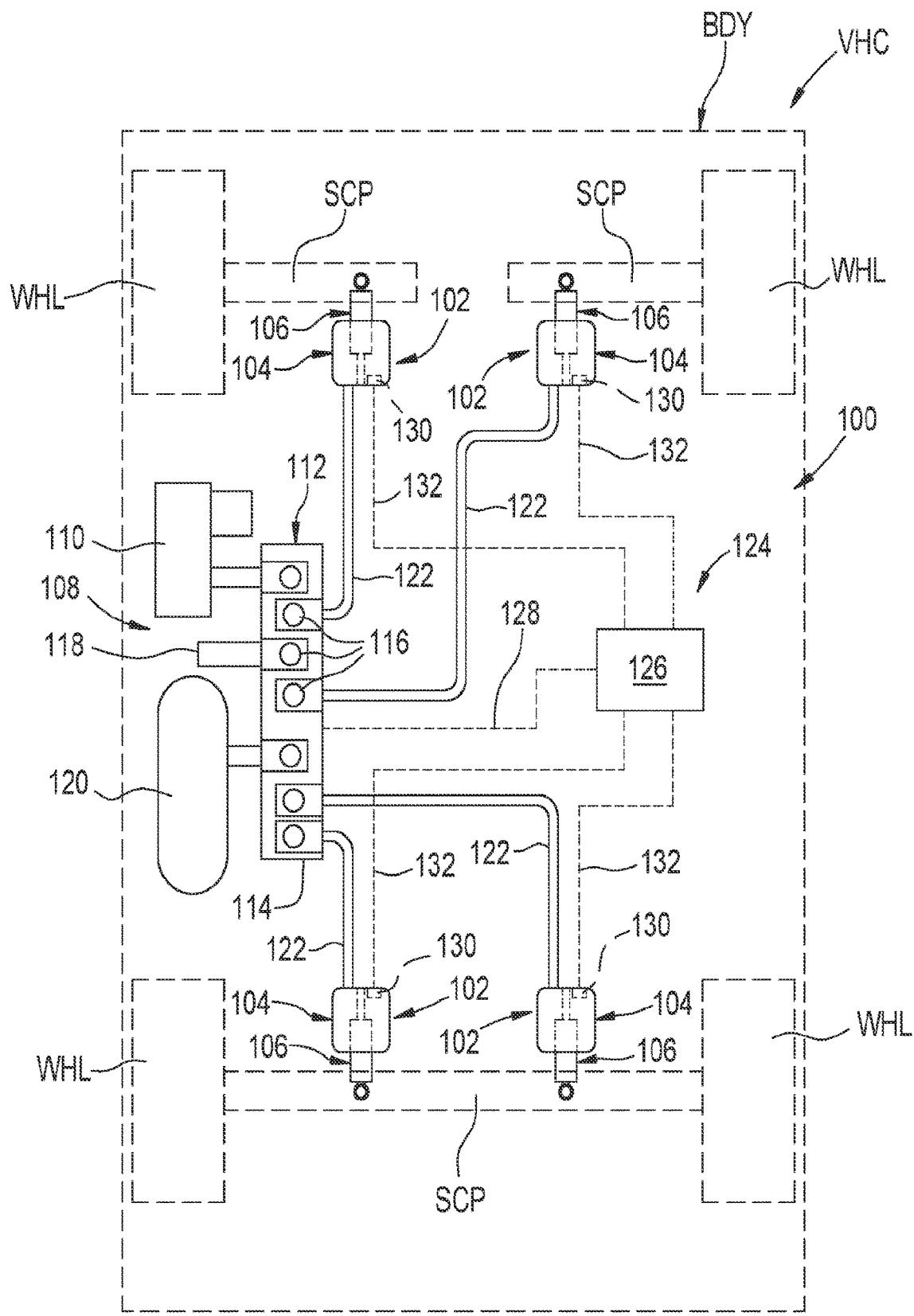
FIG. 1 is a schematic representation of one example of a suspension system of an associated vehicle that includes one or more gas spring and damper assemblies in accordance with the subject matter of the present disclosure.
Figure 2:
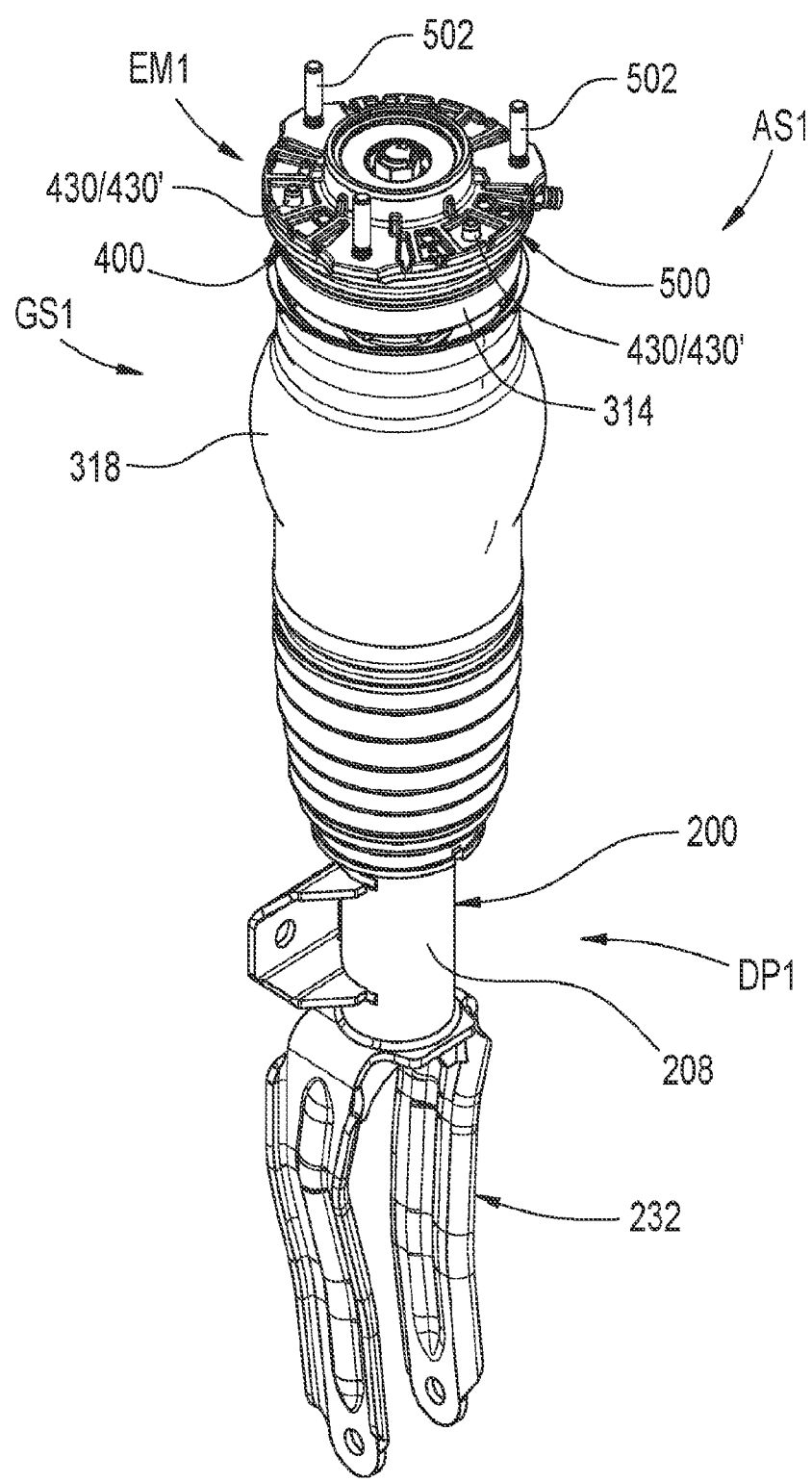
FIG. 2 is a top perspective view of one example of a gas spring and damper assembly in accordance with the subject matter of the present disclosure.

FIG. 1 illustrates one example of a suspension system 100 operatively disposed between a sprung mass, such as an associated vehicle body BDY, for example, and an unsprung mass, such as an associated wheel WHL or an associated suspension component SCP, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system can include any suitable number of gas spring and damper assemblies. For example, in the arrangement shown in FIG. 1, suspension system 100 includes four gas spring and damper assemblies 102, one of which is disposed toward each corner of the associated vehicle adjacent a corresponding wheel WHL. It will be appreciated, however, that any other suitable number of gas spring and damper assemblies could alternately be used in any other configuration and/or arrangement. As shown in FIG. 1, gas spring and damper assemblies 102 are supported between suspension components SCP and body BDY of associated vehicle VHC, and include a gas spring (or gas spring assembly) 104 and a damper (or damper assembly) 106. It will be recognized that gas springs 104 are shown and described herein as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary arrangement shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas for an extended period of time (e.g., seconds, minutes, hours, weeks, days, months).

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more sensing devices 130, such as, for example, may be operatively associated with the gas spring and damper assemblies and capable of outputting or otherwise generating data, signals and/or other communications having a relation to one or more of: a height of the gas spring and damper assemblies; a distance between other components of the vehicle; a pressure or temperature having a relation to the gas spring and damper assembly and/or a wheel or tire or other component associated with the gas spring and damper assembly; and/or an acceleration, load or other input acting on the gas spring and damper assembly. Sensing devices 130 can be in communication with ECU 126, which can receive the data, signals and/or other communications therefrom. The sensing devices can be in communication with ECU 126 in any suitable manner, such as through conductors or leads 132, for example. Additionally, it will be appreciated that the sensing devices can be of any suitable type, kind and/or construction and can operate using any suitable combination of one or more operating principles and/or techniques.

Figure 5:
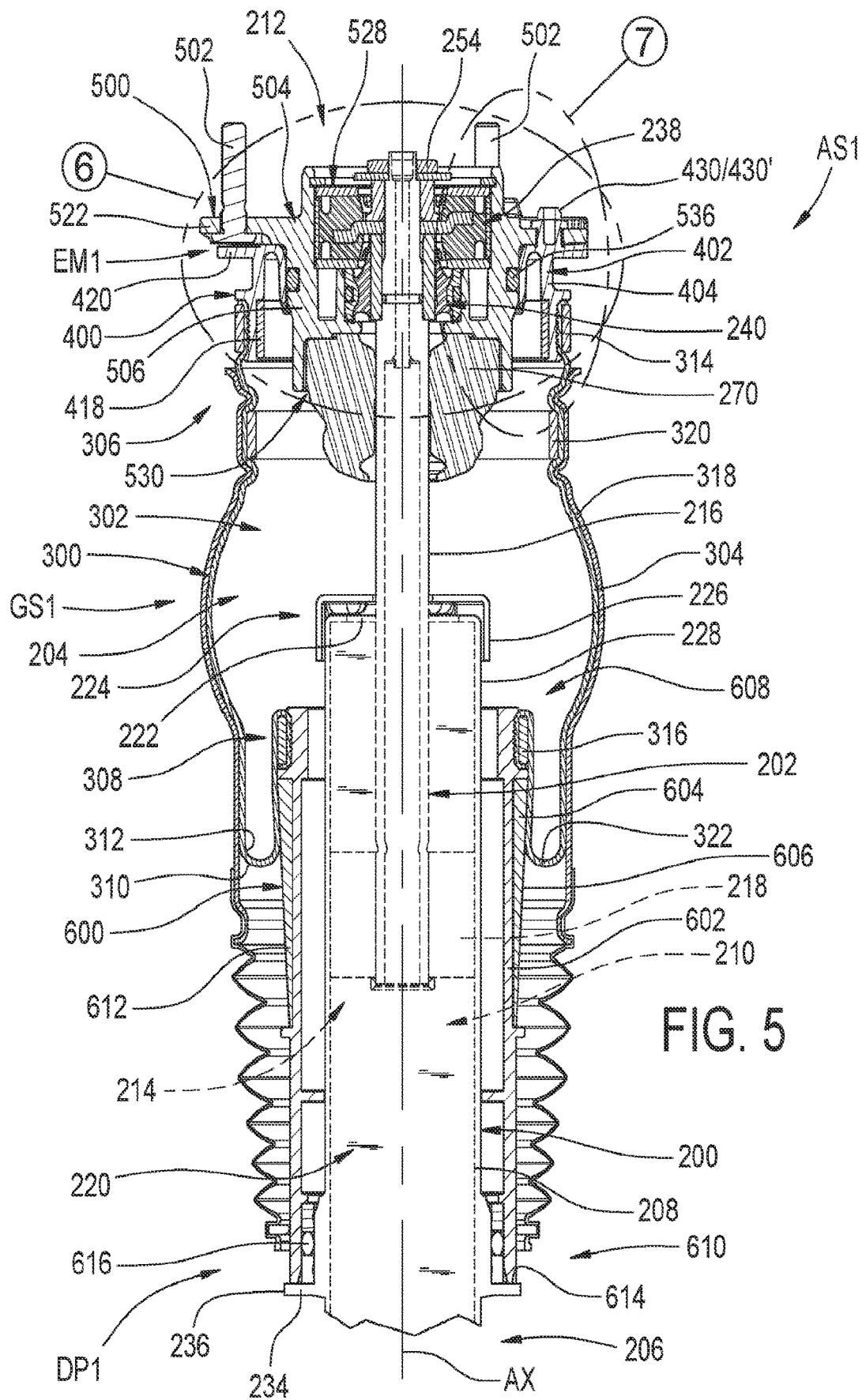
FIG. 5 is a cross-sectional side view of the gas spring and damper assembly in FIGS. 2-4 taken from along line 5-5 in FIG. 4.
Figure 6:
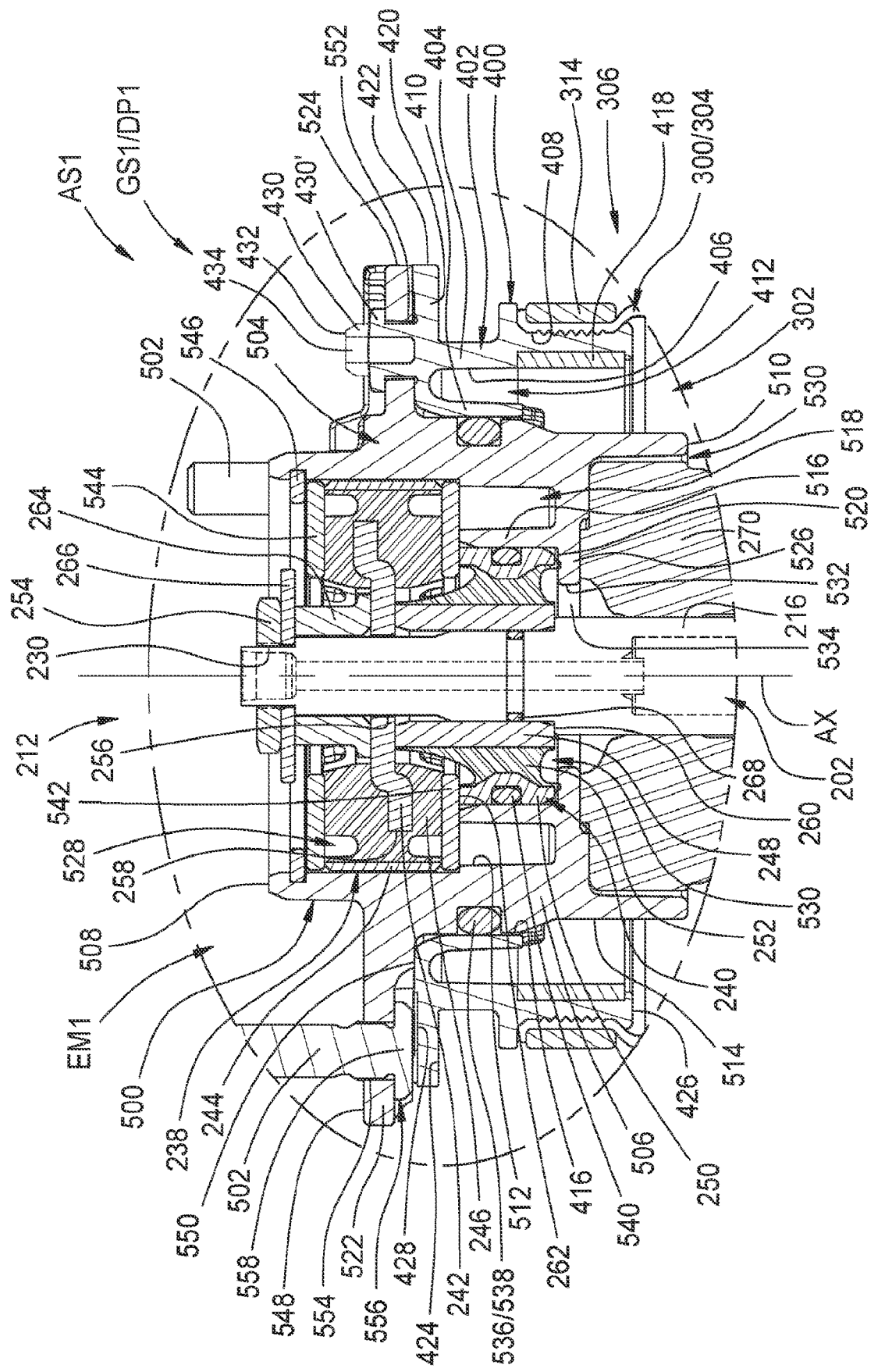
FIG. 6 is an enlarged view of the portion of the gas spring and damper assembly in FIGS. 2-5 identified as Detail 6 in FIG. 5.

Having described an example of a suspension system (e.g., suspension system 100) that can include gas spring and damper assemblies in accordance with the subject matter of the present disclosure, an example of such a gas spring and damper assembly will now be described in connection with FIGS. 2-9. As shown therein, a gas spring and damper assembly AS1, such as may be suitable for use as one or more of gas spring and damper assemblies 102 in FIG. 1, is shown as including a gas spring (or gas spring assembly) GS1, such as may correspond to one of gas springs 104 in FIG. 1, for example, and a damper (or damper assembly) DP1 such as may correspond to one of dampers 106 in FIG. 1, for example. Gas spring assembly GS1 and damper assembly DP1 can be disposed in an axially coextensive arrangement with one another, and can be operatively secured to one another in any suitable manner, such as is described hereinafter, for example. A longitudinal axis AX extends lengthwise along assembly AS1, as shown in FIGS. 5 and 6.

Damper assembly DP1 can include a damper housing 200 and a damper rod assembly 202 that is at least partially received in the damper housing. Damper housing 200 extends axially between housing ends 204 and 206, and includes a housing wall 208 that at least partially defines a damping chamber 210. Damper rod assembly 202 extends lengthwise between opposing ends 212 and 214 and includes an elongated damper rod 216 and a damper piston 218 disposed along end 214 of damper rod assembly 202. Damper piston 218 is received within damping chamber 210 of damper housing 200 for reciprocal movement along the housing wall in a conventional manner. A quantity of damping fluid 220 can be disposed within damping chamber 210, and damper piston 218 can be displaced through the damping fluid to dissipate kinetic energy acting on gas spring and damper assembly AS1. Though damper assembly DP1 is shown and described herein as having a conventional construction in which a hydraulic fluid is contained within at least a portion of damping chamber 210, it will be recognized and appreciated that dampers of other types, kinds and/or constructions, such as pressurized gas or "air" dampers, for example, could be used without departing from the subject matter of the present disclosure.

That is, it will be appreciated that a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Housing wall 208 can form an opening (not numbered) along housing end 204. A damper end wall 222 can extend across the opening and can be secured on or along housing wall 218 such that a substantially fluid-tight connection is formed therebetween. Damper end wall 222 can include an opening (not numbered) and elongated damper rod 216 can extend axially outward from damping chamber 210 through the opening in a direction opposite housing end 206. Additionally, a damper end wall (not numbered) can be connected across end 206 of damper housing 200 such that a substantially fluid-tight connection is formed therebetween. In some cases, an end cap 224 (which is sometimes referred to in the art as a striker cap) that includes an outer side surface portion 226 can be supported on or along end 204 of damper housing 200. In other cases, an outside surface portion 228 of housing wall 208 can be exposed on or along end 204 of the damper housing.

Elongated damper rod 216 can project outwardly from damper end wall 222 such that end 212 of the damper rod assembly is outwardly exposed from the damper housing and is externally accessible with respect to the damper housing. A connection structure 230, such as a plurality of threads, for example, can be provided on or along the elongated rod for use in operatively connecting gas spring and damper assembly 200, either directly or indirectly, to an associated vehicle structure, a component of gas spring assembly GS1 or another component of gas spring and damper assembly AS1.

Figure 3:
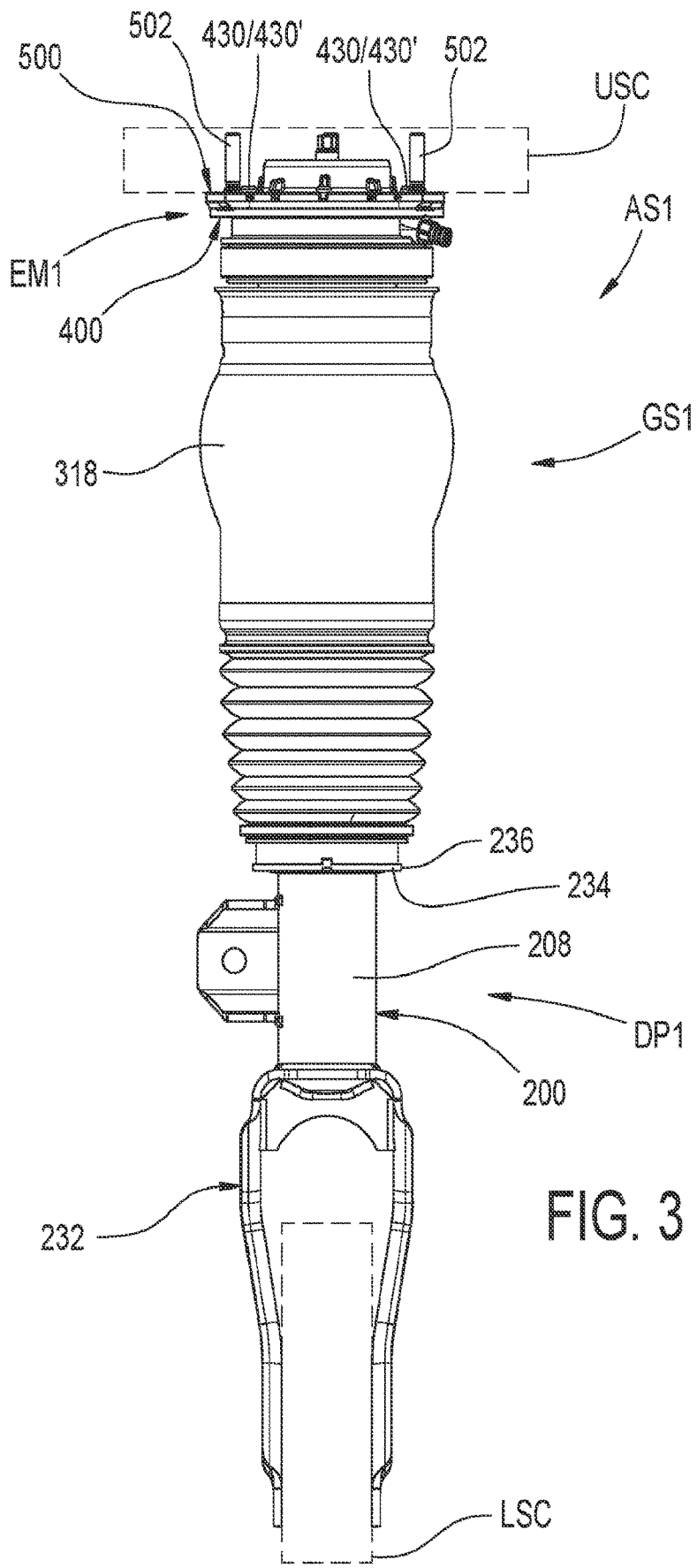
FIG. 3 is a side elevation view of the gas spring and damper assembly in FIG. 2.
Figure 4:
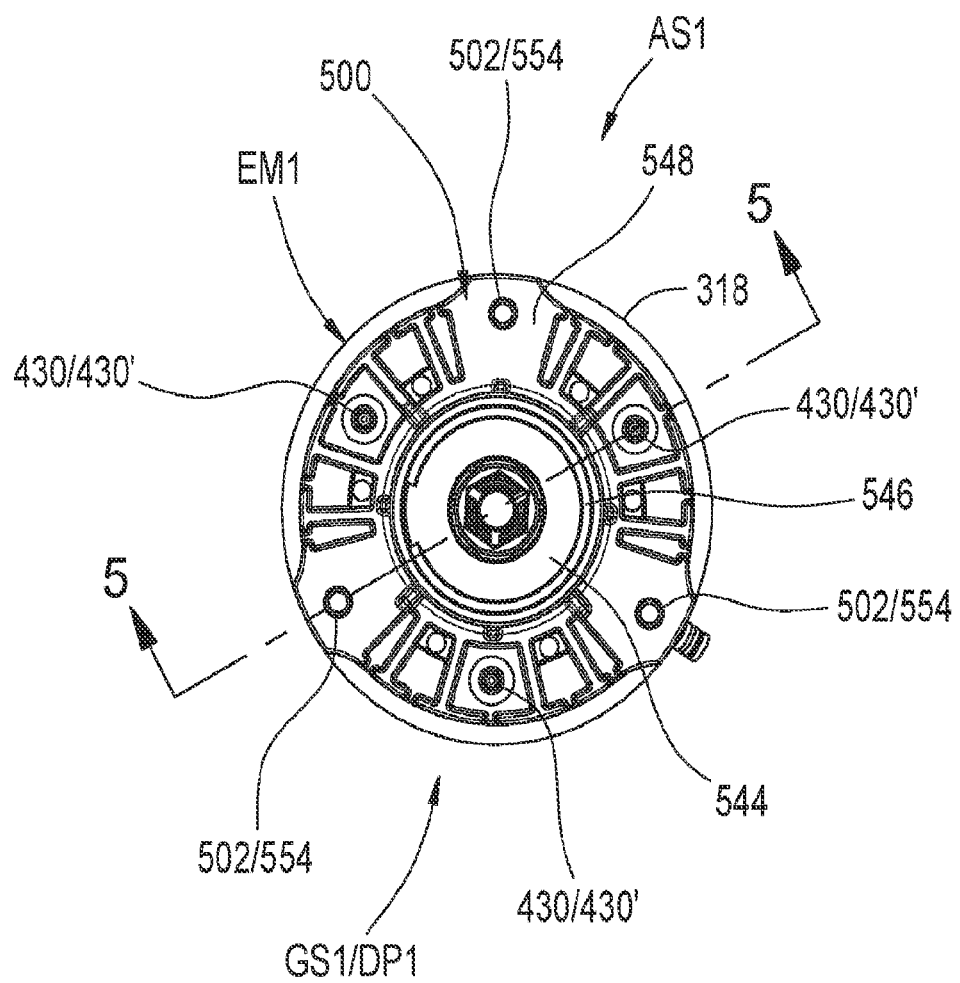
FIG. 4 is a top plan view of the gas spring and damper assembly in FIGS. 2 and 3.

It will be appreciated that gas spring and damper assembly AS1 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 3, for example, end 212 of damper rod assembly 202 can be operatively engaged (either directly or indirectly) with a first or upper structural component USC, such as associated vehicle body BDY in FIG. 1, for example, and can be secured thereon in any suitable manner. As one non-limiting example, gas spring and damper assembly AS1 can include an end member assembly EM1 that can be secured to upper structural component USC and to which one or more components of gas spring assembly GS1 and/or one or more components of damper assembly DS1 can be operatively connected. Additionally, or in the alternative, damper assembly DP1 can include a mounting bracket 232 disposed along end 206 of damper housing 200, which can be secured on or along a second or lower structural component LSC (FIG. 3), such as associated suspension component SCP in FIG. 1, for example, and can be secured thereon in any suitable manner.

Gas spring assembly GS1 can include a flexible spring member 300 that can extend peripherally around axis AX and can be secured between opposing end members (or end member assemblies) in a substantially fluid-tight manner such that a spring chamber 302 is at least partially defined therebetween. As a non-limiting example, end member assembly EM1 can include an end member (or end member body) 400 to which one end of flexible spring member 300 can be secured and an end member (or end member body) 500 to which end 212 of damper rod assembly 202 can be operatively connected. Additionally, or in the alternative, gas spring assembly GS1 can include an end member assembly 600 that is supported on or along damper housing 200. The end of flexible spring member 300 that is opposite end member 400 can be secured on or along end member assembly 600 in any suitable manner. Additionally, it will be appreciated that end member 600 can be operatively supported on or along damper housing 200 in a suitable manner. As a non-limiting example, damper housing 200 can include a support wall or support wall portion 234 that extends radially outward from along the damper housing toward an outer peripheral edge 236 with end member assembly 600 at least partially supported on or along support wall portion 234.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 2-8 as including a flexible wall 304 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 400 of end member assembly EM1 and/or suitable for forming a substantially fluid-tight connection with end member assembly 600. As one example, flexible spring member 300 can include open ends (not identified) that are secured on or along the corresponding end members by way of one or more crimp rings 314 and 316. Alternately, a mounting bead (not shown) can be disposed along either or both of the ends of the flexible wall. In some cases, the mounting bead, if provided, can, optionally, include a reinforcing element, such as an endless, annular bead wire, for example. In some cases, a restraining cylinder 318 and/or other components can be disposed radially outward along flexible wall 304. In some cases, such components can be secured on or along the flexible wall in a suitable manner, such as by way of one or more backing rings 320, for example.

As mentioned above, gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As shown in FIGS. 2-8, for example, end member 500 can include one or more securement devices 502 (e.g., threaded fasteners) operable to secure end member assembly EM1 on or along upper structural component USC, such as associated vehicle body BDY in FIG. 1, for example. Damper assembly DP1 can be operatively connected to the upper structural component by way of end member assembly EM1, and can be operatively engaged with the end member assembly in any suitable manner.

For example, damper assembly DP1 and/or end member assembly EM1 can include a bushing assembly 238 that can be supported on or along end member 500 and to which damper rod assembly 202 is operatively connected. Additionally, or in the alternative, damper assembly DP1 and/or end member assembly EM1 can include a bushing assembly 240 that can be supported on or along end member 500 and to which damper rod assembly 202 is operatively connected. If included, bushing assembly 238 can include an inner metal 242, an outer metal 244 and an elastomeric body 246 permanently attached (i.e., inseparable without damage, destruction or material alteration of at least one of the component parts) between the inner and outer metals. Additionally, or in the alternative, bushing assembly 240, if included, can include an inner metal 248, an outer metal 250 and an elastomeric body 252 permanently attached between the inner and outer metals. In such an arrangement, elongated damper rod 218 can extend through damper bushing 238 and/or damper bushing 240, and can be secured therealong in a suitable manner, such as by way of a securement device 254 (e.g., a threaded nut) cooperatively engaging connection structure 230 of elongated damper rod 216, for example.

In some cases, inner metal 242 can take the shape of an annular plate or disk that projects radially outward from an inner peripheral edge 256 toward an outer peripheral edge 258 with at least a portion of inner metal 242 embedded within elastomeric body 246. In an assembled condition of the exemplary arrangement shown in FIGS. 5 and 6, inner metal 248 can be positioned on or toward a step or shoulder surface portion 260 formed on or along elongated damper rod 216 toward end 212 thereof. Inner metal 242 can be positioned on, along or otherwise adjacent an end 262 of inner metal 248 with a spacer 264 (which is optional depending on the geometry of inner metal 242) disposed on, along or otherwise adjacent inner metal 242 opposite inner metal 248. A washer 266 can, optionally, be disposed on or along spacer 264, if included, with securement device 254 both inner metals (through the spacer and/or washer, if included) toward shoulder surface portion 260 to at least partially secure elongated damper rod 216 on or along end member assembly EM1 through bushing assembly 238 and/or bushing assembly 240. One or more sealing devices 268 can be operatively disposed between elongated damper rod 216 and inner metal 242 and/or inner metal 248 such that a substantially fluid-tight seal is formed therebetween.

It will be appreciated that gas spring and damper assembly AS1 is displaceable, during use in normal operation, between extended and compressed conditions. In some cases, one or more jounce bumpers can be included to inhibit contact between one or more features and/or components of assembly AS1. For example, damper assembly DP1 can include a jounce bumper 270 positioned on or along elongated damper rod 216 within spring chamber 302. It will be appreciated that the jounce bumper, if provided, can be supported in any suitable manner. As a non-limiting example, jounce bumper 260 can be supported on end member assembly 500 to substantially inhibit contact between a component of damper assembly DP1 and end member assembly 500 during a full jounce condition of assembly AS1. It will be appreciated, however, that other configurations and/or arrangements could alternately be used.

End member assembly 600 is of a type and kind commonly referred to as a roll-off piston or piston assembly. It will be appreciated that end member assembly 600 can include any suitable number of one or more components and/or elements. For example, in the arrangement shown and described herein, end member assembly 600 includes an end member core 602 that is disposed along and supported on damper housing 200. An end member shell (or shell section) 604 is supported on the end member core and can include an outer surface 606 along which a rolling lobe 322 of flexible spring member 300 can be displaced as gas spring and damper assembly AS1 is displaced between compressed and extended conditions. It will be appreciated that end member core 602 can be configured to receive and support one or more end member shells and/or shell sections, such as may have any one of a wide variety of different sizes, shapes and/or configurations (e.g., outer profiles with different combinations of contours and/or shapes).

Additionally, it will be appreciated that end member assembly 600 and the one or more components and/or elements thereof can be formed from any suitable material or combination of materials, and can include any suitable number or combination of one or more walls and/or wall portions. For example, end member core 602 and/or end member shell sections 604 can be formed from a suitable polymeric material or combination of polymeric materials, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

End member core 602 is shown as extending peripherally about axis AX and longitudinally between opposing ends 608 and 610. End member core 602 can include a first or upper mounting section 612 toward end 608 on or along which end 308 of flexible spring member 300 can be operatively connected in a suitable manner. For example, retaining ring 316 can be crimped radially-inward or otherwise deformed to form a substantially fluid-tight connection between end 308 of flexible spring member 300 and mounting section 612 of end member core 602. In this manner, spring chamber 302 can be at least partially defined by flexible spring member 300 between end member 400 and end member assembly 600, such as has been described above.

End member core 602 can be supported on or along damper housing 200 in any suitable manner. As one non-limiting example, an end surface portion 614 of end member core 602 along end 610 thereof can be disposed on or along support wall portion 234 of damper housing 200 to support the end member core on the damper housing in at least one axial direction. A sealing device 616 can be sealingly disposed between end member core 602 and damper housing 200 such that a substantially fluid-tight seal is formed therebetween. It will be appreciated, however, that other configurations and/or arrangements could alternately be used.

As discussed above, end member assembly EM1 can be configured to interconnect flexible spring member 300 of gas spring assembly GS1 and damper rod assembly 202 of damper assembly DP1 as well as operatively connect the gas spring assembly and the damper assembly to an associated structural component, such as upper structural component USC, for example. End member (or end member body) 400 and end member (or end member body) 500 can be permanently interconnected in a substantially-fixed coextensive arrangement through the use of one or more attachment studs secured or otherwise provided on or along either or both of the end members. The one or more attachment studs extend axially through one or more attachment passages in the other one or both of the end members. A distal end of the attachment studs is permanently deformed into attachment heads that have a larger cross-sectional dimension than that of the attachment passages. The permanently (i.e., unalterable without damage, destruction or material alteration of at least one of the component parts) secures end members 400 and 500 together in a substantially-fixed axial position relative to one another.

In the arrangement shown and described herein, end member 400 includes the one or more attachment studs and end member 500 includes the one or more attachment passages. It will be appreciated, however, that an alternate construction in which end member 400 include the one or more attachment passages and end member 500 include the one or more studs is intended to find support in the subject disclosure as if such embodiments were fully shown and described herein. Additionally, or in the alternative, an alternate construction in which end member 400 and end member 500 each include one or more attachment studs and one or more attachment openings that are cooperative with one another is also intended to find full support in the subject disclosure as if such embodiments were fully shown and described herein.

End member 400 is shown and described herein as including an end member wall 402 that extends peripherally about longitudinal axis AX. End member wall 402 includes a side wall portion 404 with an inner surface portion 406 facing radially inward. Side wall portion 404 can include an outer surface portion 408 that is dimensioned to receive end 306 of flexible spring member for securement therealong in a suitable manner, such as by way of crimp ring 314, for example. In some cases, end member wall 402 can include a side wall portion 410 that is disposed radially inward of side wall portion 404 such that an annular groove or channel 412 can be disposed therebetween. End member wall 402 at least partially defines an end member passage 414 that extends through end member 400 and is dimensioned to receive at least a portion of end member 500. As such, side wall portion 404 and/or side wall portion 410, if included, can at least partially define an inner surface portion 416 of end member wall 402 on or along which a corresponding outer surface portion of end member 500 can be positioned, such as is described hereinafter.

In some cases, a backing ring 418 can be disposed radially inward of side wall portion 404 to provide additional strength and/or rigidity to end member 400, such as under a crimp load or force applied by crimp ring 314, for example. A flange wall portion 420 is disposed transverse to longitudinal axis AX, and can extends radially outward beyond side wall portion 404 to an outer peripheral edge 422. In some cases, flange wall portion 420 can also extend radially inward and operatively connect side wall portion 404 and side wall portion 410, if included, such as may at least partially define a closed end of channel 412, for example. Flange wall portion 420 of end member wall 402 includes a flange surface portion 424 from which at least side wall portion 404 extends toward a distal edge 426. Flange wall portion 420 also includes a flange surface portion 428 facing opposite flange surface portion 424.

Figure 9:
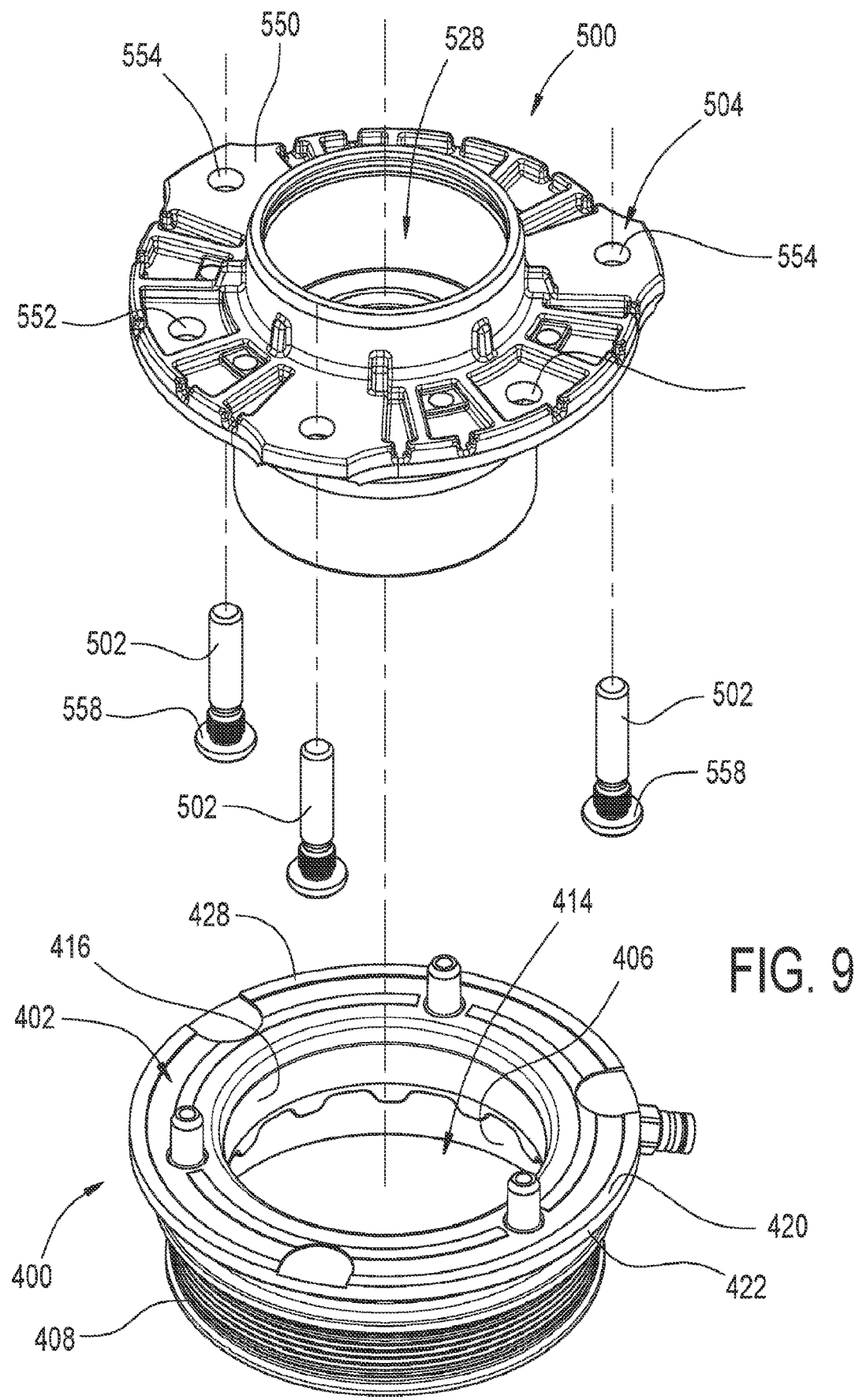
FIG. 9 is an exploded view of an end member assembly in accordance with the subject matter of the present disclosure, such as is shown in FIGS. 2-8, for example prior to undergoing the permanent assembly process.

With reference to the discussion set forth above regarding the inclusion herein of alternate constructions and as one example of an end member assembly in accordance with the subject matter of the present disclosure, end member 400 can include one or more attachment studs 430 operatively connected to end member wall 402. In a preferred construction, a plurality of attachment studs 430 are included that are disposed in peripherally-spaced relation to one another around longitudinal axis AX. Attachment studs 430 can extend from along flange wall portion 420 axially away from flange surface portion 428 toward a distal end 432. In some cases, attachment studs 430 can be integrally attached to end member wall 402, such as on or along flange wall portion 420 thereof, for example. In a preferred arrangement, however, attachment studs 430 can be unitarily formed with end member wall 402, such as on or along flange wall portion 420, for example. In some cases, attachment studs 430 can include one or more holes 434 extending into the attachment studs from along distal end 432 thereof, such as may aid in formation of attachment heads during assembly, for example. Attachment studs 430 are shown in FIG. 9 prior to assembly as having an overall length extending from at least approximately flange surface portion 428 to at least approximately distal end 432, as is represented by reference dimension LG1. After assembly, as discussed below, attachment studs 430 are permanently deformed and have an overall length extending from at least approximately flange surface portion 428 to a distal extent of stud heads (or attachment heads) 430', as is represented by reference dimension LG2. Additionally, attachment studs 430 are also shown prior to assembly as having a cross-sectional dimension, which is represented in FIG. 9 by reference dimension CD1 and after being permanently deformed during assembly with stud heads 430' integrally formed from attachment studs 430 and having a cross sectional dimension represented by reference dimension CD2 in FIG. 7.

End member 500 is shown and described herein as including an end member wall 504 that extends peripherally about longitudinal axis AX. End member wall 504 includes a side wall portion 506 that extends axially from an end surface portion 508 toward an end surface portion 510 facing opposite end surface portion 508. Side wall portion 506 can include an inner side surface portion 512 as well as an outer side surface portion 514. End member wall 504 can also include a side wall portion 516 that is disposed radially inward of side wall portion 506 such that an annular groove or channel 518 can be disposed therebetween. Side wall portion 516 can include an inner side surface portion 520 facing radially inward.

End member wall 504 also includes a flange wall portion 522 that extends outwardly from along side wall portion 506 to an outer peripheral edge 524. An end wall portion 526 extends radially inward from along side wall portion 506. End wall portion 526 can operatively connect side wall portions 506 and 516, and together therewith can at least partially define a recess 528 within which bushing assembly 238 and/or 240 are at least partially received and a recess 530 within which at least a portion of jounce bumper 270 can be received. End wall portion 526 can extend radially inward toward an inner peripheral edge 532 that at least partially defines an opening or passage 534 through end member 500. Additionally, a seal 536 can be disposed between end members 400 and 500, and it will be appreciated that any suitable configuration and/or arrangement can be used to receive and retain seal 536 in sealing engagement between the end members such that a substantially fluid-tight seal is maintained therebetween. As a non-limiting example, an annular groove 538 can be formed on or along outer side surface portion 514 of side wall portion 506 that is dimensioned to at least partially receive seal 536. It will be appreciated, however, that other configurations and/or arrangements could alternately be used.

As discussed above, bushing assemblies 238 and/or 240 can be at least partially disposed within recess 528 of end member 500 and can be operatively secured thereto in any suitable manner. As a non-limiting example, bushing assembly 240 can, if included, be disposed within recess 528 with outer metal 250 and/or elastomeric body 252 disposed on or along end wall portion 526 such that the outer surface of outer metal 250 is disposed in facing relation to inner side surface portion 520 of side wall portion 516. Additionally, or in the alternative, bushing assembly 238 can be disposed within recess 528 with outer metal 244 disposed in facing relation to inner side surface portion 512 of side wall portion 506. In such cases, one or more sealing devices 540 can be operatively disposed between at least one of outer metals 244 and/or 250 and at least one of side wall portions 506 and/or 516 such that a substantially fluid-tight seal is formed therebetween. Optionally, an annular washer or disk 542 can be supported on an end surface portion (not numbered) of side wall portion 516 and/or outer metal 250. If included, outer metal 244 can be supported on or along annular disk 542. Additionally, or in the alternative, an annular washer or disk 544 can be disposed within recess 528 on or along outer metal 244 and/or elastomeric body 246 of bushing assembly 238. Outer metal 244 and outer metal 250, if included, can be secured within recess 528 in any suitable manner, such as by way of a retaining ring 546 operatively engaging a corresponding groove (not numbered) disposed along inner side surface portion 512, for example.

Figure 7:
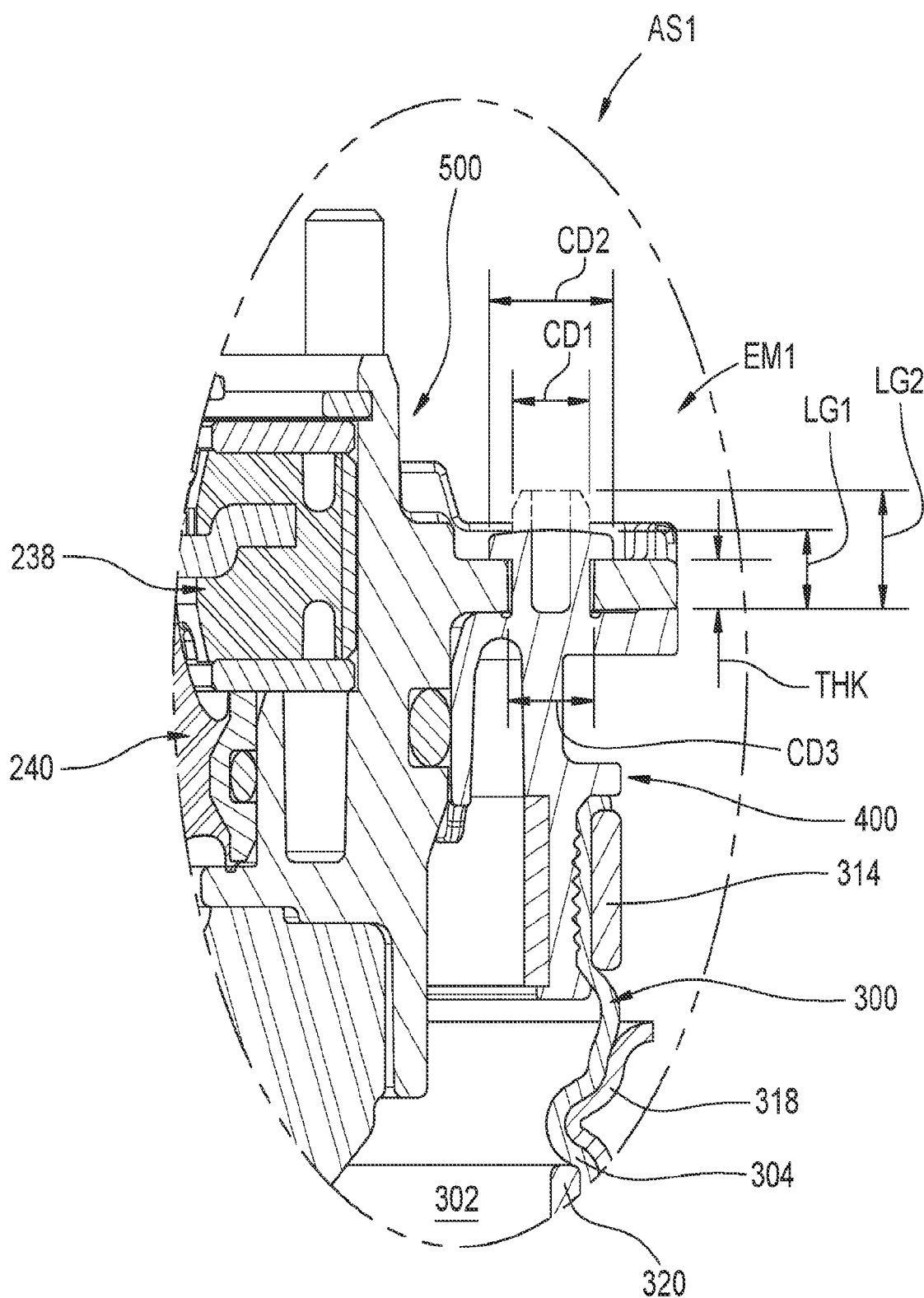
FIG. 7 is an enlarged view of the portion of the gas spring and damper assembly in FIGS. 2-6 identified as Detail 7 in FIG. 5.

Flange wall portion 522 of end member wall 504 includes a flange surface portion 548 facing in an axial direction toward end surface portion 508 and a flange surface portion 550 facing opposite side surface portion 548. As such, flange wall portion 522 has a thickness or height between flange surface portions 548 and 550, as is represented in FIG. 7 by reference dimension THK. Additionally, with repeated reference to the discussion set forth above regarding the inclusion herein of alternate constructions and as one example of an end member assembly in accordance with the subject matter of the present disclosure, end member 500 can include one or more attachment passages 552 extending through flange wall portion 522. In a preferred arrangement, a plurality of attachment passages 552 can be used. In such cases, the plurality of attachment passages can be disposed in peripherally-spaced relation to one another around longitudinal axis AX. Attachment passages 552 have a cross-sectional dimension, which is represented in FIG. 9 by reference dimension CD3. As such, thickness THK of flange wall portion 522 together with overall length LG1 of attachment studs 430 before assembly and overall length LG2 of the attachment studs with stud heads 430' after assembly are represented by the relationship:

$$LG1 \geq LG2 > THK$$

Additionally, cross-sectional dimension CD3 of attachment passages 552 together with cross-sectional dimension CD1 of attachment studs 430 and cross-sectional dimension CD2 of stud heads 430' are represented by the relationship:

$$CD2 > CD3 > CD1$$

As discussed above, end member 500 can include a plurality of securement devices 502 (e.g., threaded fasteners) operatively connected to end member wall 504, such as on or along flange wall portion 522, for example. In the arrangement shown and described herein, flange wall portion 522 includes a plurality of holes 554 extending therethrough with one of securement devices 502 disposed within a corresponding one of holes 554. In some cases, securement devices 502 can take the form of threaded fasteners that include a fastener head 556 that is disposed on or along flange surface portion 550 such that the securement devices extend through holes 554 with a remainder of the threaded fastener projecting axially outward beyond flange surface portion 548. In some cases, flange wall portion 544 can include one or more recesses 556 formed therein from along flange surface portion 550 that are dimensioned to receive at least a portion of fastener head 558.

In some cases, end member 400 can be at least partially formed from a first materials, such as a metal material, for example, and end member 500 can be formed from a second material, such as a polymeric material or combination of polymeric materials, that is different than the first material. As non-limiting examples, the first material could be steel, aluminum or zinc, whereas the second material could be a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

In an assembled condition, end member 500 is at least partially received within passage 414 of end member 400 such that flange surface portion 428 and flange surface portion 550 are disposed in facing relation to one another. Additionally, in such an arrangement, each one of attachment studs 430 is aligned with and extends into and through a corresponding one of attachment passages 552. In some cases, flange surface portions 428 and 550 can be disposed in abutting engagement with one another, such as is shown in FIGS. 5-8, for example. Securement devices 502 are disposed in peripherally spaced relation to one another, and can include one or more of securement devices 502 disposed between adjacent ones of attachment studs 430 and/or attachment passages 552. Once positioned coextensively with one another, end members 400 and 500 can be permanently secured together by permanently deforming a distal end of attachment studs 430 into attachment heads 430' that are unitarily formed from attachment studs 430. Stud heads 430' are disposed in abutting engagement with flange surface portion 426 and have a larger cross-sectional dimension than that of the attachment passages, which permanently secures (i.e., inseparable without damage, destruction or material alteration of at least one of the component parts) end members 400 and 500 in a substantially-fixed axial position relative to one another.

Figure 8:
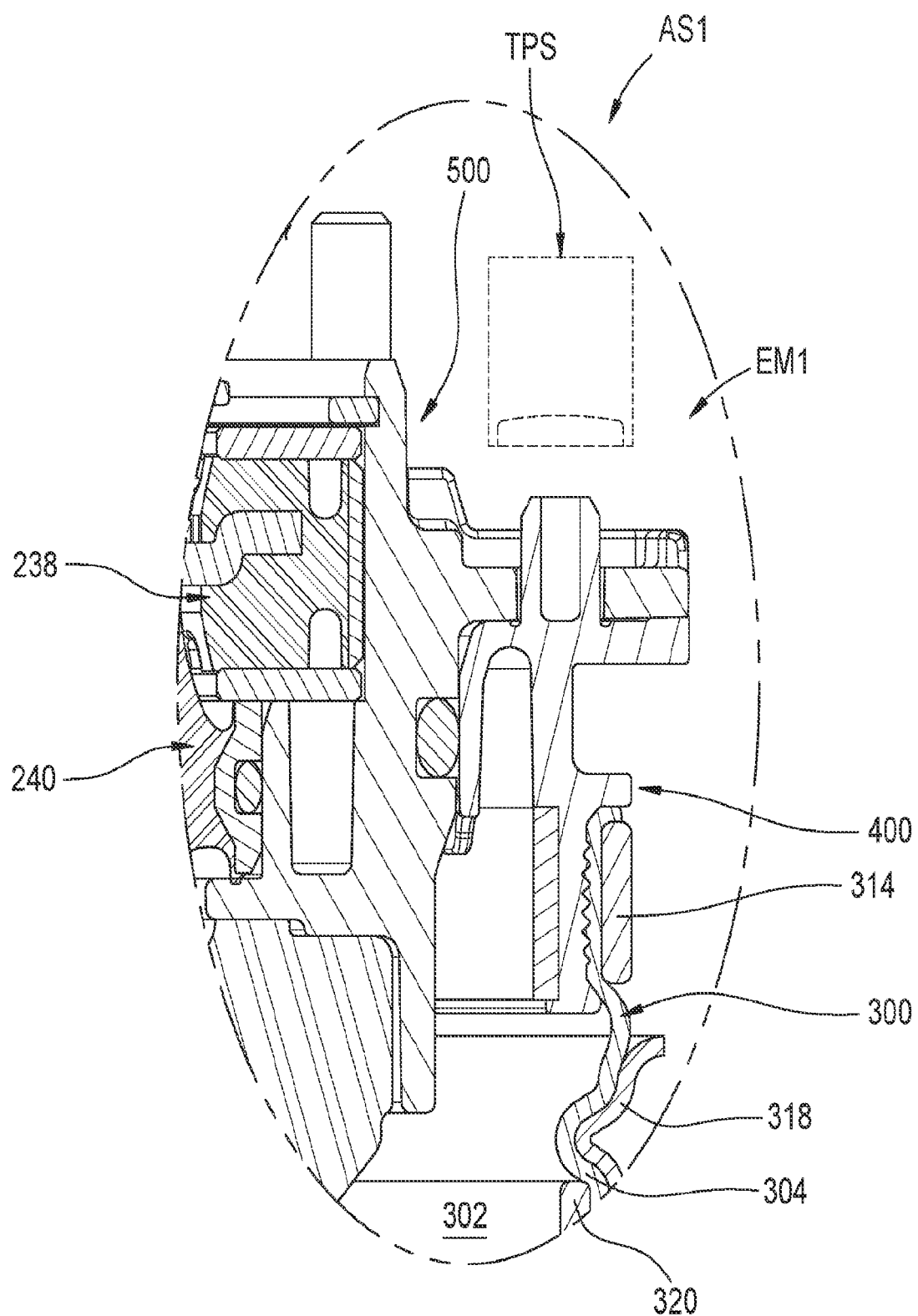
FIG. 8 is the enlarged view of the portion of the gas spring and damper assembly in FIG. 7 prior to performance of a permanent assembly process in accordance with the subject matter of the present disclosure.

One example of a method of assembling an end member assembly in accordance with the subject matter of the present disclosure includes providing a first end member such as one of end members 400 and 500, for example. The method also includes providing a second end member such as the other one of end members 400 and 500. The method can further include at least approximately rotationally aligning one or more of attachment studs 430 with corresponding ones of attachment passages 552 about the longitudinal axis. The method can also include positioning end members 400 and 500 axially coextensively such that one or more of attachment studs 430 extend into and through corresponding ones of attachment passages 552. The method can further include permanently deforming distal end 432 of attachment studs 430 into attachment heads 430' that are unitarily formed from attachment studs 430. Attachment heads 430' have a larger cross-sectional dimension than that of the attachment passages, which secures end members 400 and 500 in a substantially-fixed axial position relative to one another. As non-limiting examples, suitable techniques for permanently deforming attachment studs 430 to include unitarily-formed attachment heads 430' are sometimes referred to as thermoplastic staking or heat staking, as is represented in FIG. 8 by device TPS.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly having a longitudinal axis and dimensioned for securement to an associated flexible spring member, said end member assembly comprising:
a first end member including a first end member wall at least partially formed from a first material, said first end member wall including a first side wall portion extending peripherally about said longitudinal axis and a first flange wall portion extending radially outward from along said first side wall portion, said first flange wall portion including a first first flange surface portion and a second first flange surface portion facing opposite said first first flange surface portion, said first flange wall portion including a plurality of attachment passages extending therethrough that are disposed in peripherally-spaced relation to one another about said longitudinal axis;
a plurality of securement devices accessible from along said second first flange surface portion, said plurality of securement devices disposed in peripherally-spaced relation to one another about said longitudinal axis with one or more of said plurality of securement devices disposed between adjacent ones of said plurality of attachment passages;
a second end member including a second end member wall at least partially formed from a second material, said second end member wall including a second side wall portion extending peripherally about said longitudinal axis, a third side wall portion disposed radially outward of said second side wall portion that is dimensioned to receivingly engage the associated flexible spring member therealong and a second flange wall portion extending radially outward from along at least one of said second and third side wall portions, said second flange wall portion including a first second flange surface portion, said second end member including a plurality of attachment studs disposed along said second flange wall portion in peripherally-spaced relation to one another about said longitudinal axis, said plurality of attachment studs projecting axially from said first second flange surface portion; and, a sealing device at least partially formed from a third material;

said first and second end members positioned axially coextensive with one another with said sealing device sealingly disposed between axially-coextensive portions of said first side wall portion of said first end member and said second side wall portion of said second end member and such that said first first flange surface portion and said second first flange surface portion are disposed in facing relation to one another with at least one of said plurality of attachment studs extending through a corresponding one of said plurality of attachment passages and beyond said second first flange surface portion with a stud head unitarily formed along said at least one of said plurality of attachment studs, said stud head abuttingly engaging said second first flange surface portion of said first flange wall portion thereby retaining said first and second end members in an assembled condition.

2. An end member assembly according to claim 1 further comprising a plurality of receiving holes extending through said first flange wall portion of said first end member in peripherally-spaced relation to one another with one of said plurality of securement devices extending through one of said plurality of receiving holes.

3. An end member assembly according to claim 2, wherein each of said plurality of receiving holes is peripherally positioned between adjacent ones of said plurality of attachment passages and/or adjacent ones of said plurality of attachment studs.

4. An end member assembly according to claim 2, wherein a portion of each of said plurality of securement devices is axially captured between said first and second flange wall portions.

5. An end member assembly according to claim 2, wherein at least one of said first first flange surface of said first flange wall portion and first second flange surface portion of said second flange wall portion includes a plurality of recesses with each of said plurality of recesses dimensioned to receive a portion of one of said plurality of securement devices such that said plurality of securement devices is axially captured between said first and second flange wall portions.

6. An end member assembly according to claim 1, wherein an outer surface portion of said third side wall portion is dimensioned to receivingly engage the associated flexible spring member for securement thereto.

7. An end member assembly according to claim 1, wherein said first and second end members are coextensively positioned such that said first first flange wall portion of said first end member and said first second flange wall portion of said second end member are disposed in abutting engagement with one another.

8. An end member assembly according to claim 1, wherein said plurality of attachment studs are unitarily formed with said second end member wall.

9. An end member assembly according to claim 1, wherein said corresponding one of said plurality of attachment passages has a passage cross-sectional dimension, and said stud head of said at least one of said plurality of attachment studs has a head cross-sectional dimension greater than said passage cross-sectional dimension.

10. An end member assembly according to claim 9, wherein said passage cross-sectional dimension of each of said plurality of attachment passages are approximately equal to one another, and said plurality of attachment studs each include a stud cross sectional dimension that is less than said passage cross-sectional dimension of said plurality of attachment passages such that said plurality of attachment studs can each extend through and cooperatively engage a corresponding one of said plurality of attachment passages.

11. An end member assembly according to claim 1, wherein said first side wall portion of said first end member wall is disposed radially inward of said second side wall portion of said second end member wall with said first side wall portion at least partially defining a recess extending axially through said first end member, said recess dimensioned to receive a portion of an associated damper assembly for operative connection to said end member assembly.

12. An end member assembly according to claim 11 further comprising a first bushing assembly at least partially disposed within said recess of said first end member and dimensioned to operatively connect said first end member with the associated damper assembly.

13. An end member assembly according to claim 12 further comprising a second bushing assembly at least partially disposed within said recess of said first end member and dimensioned to operatively connect said first end member with the associated damper assembly.

14. An end member assembly according to claim 13, wherein said sealing device is a first sealing device, and said end member assembly further comprises a second sealing device disposed between said first end member wall and one of said first bushing assembly and said second bushing assembly such that a substantially fluid-tight seal is formed therebetween.

15. An end member assembly according to claim 1, wherein one of said first side wall portion of said first end member and said second side wall portion of said second end member includes an annular groove a with said sealing device disposed at least partially within said groove between said first and second end members.

16. A gas spring and damper assembly comprising:
a damper assembly having a longitudinally-extending axis and including:
a damper housing including a housing wall extending axially between opposing first and second ends, said housing wall at least partially defining a damping chamber containing a quantity of damping fluid; and,
a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing; and,
a gas spring assembly disposed in axially coextensive relation with at least a portion of said damper assembly, said gas spring assembly including:
a flexible spring member extending peripherally about said longitudinal axis and longitudinally between opposing first and second ends such that a spring chamber is at least partially defined therebetween;
a first end member assembly according to claim 1 operatively connected to said elongated damper rod and operatively secured across said first end of said flexible spring member such that a substantially fluid-tight connection is formed therebetween; and,
a second end member assembly supported on said damper housing and operatively secured across said second end of said flexible spring member such that a substantially fluid-tight connection is formed therebetween.

17. A suspension system comprising:
a pressurized gas system including a pressurized gas source and a control device; and,
at least one gas spring and damper assembly according to claim 16 disposed in fluid communication with said pressurized gas source through said control device such that pressurized gas can be selectively transferred into and out of at least said spring chamber.

18. A method of manufacturing an end member assembly dimensioned for securement to an associated flexible spring member, said method comprising:
providing a first end member including a first end member wall at least partially formed from a first material, said first end member wall including a first side wall portion extending peripherally about said longitudinal axis and a first flange wall portion extending radially outward from along said first side wall portion, said first flange wall portion including a first first flange surface portion and a second first flange surface portion facing opposite said first first flange surface portion such that a first flange thickness is defined therebetween, said first flange wall portion including a plurality of attachment passages extending therethrough and disposed in peripherally-spaced relation to one another about said longitudinal axis;
providing a second end member including a second end member wall at least partially formed from a second material, said second end member wall including a second side wall portion extending peripherally about said longitudinal axis, a third side wall portion disposed radially outward of said second side wall portion that is dimensioned to receivingly engage the associated flexible spring member therealong and a second flange wall portion extending radially outward from along at least one of said second and third side wall portions, said second flange wall portion including a first second flange surface portion, said second end member including a plurality of attachment studs disposed along said second flange wall portion in peripherally-spaced relation to one another about said longitudinal axis, said plurality of attachment studs projecting axially from said first second flange surface portion toward a distal end spaced apart from said first second flange surface portion such that said plurality of attachment studs have a first stud length that is greater than said first flange thickness of said first flange wall portion of said first end member wall;
operatively connecting a plurality of securement devices to one of said first and second end members such that said plurality of securement devices are disposed in peripherally-spaced relation to one another about said longitudinal axis with one or more of said plurality of securement devices disposed between adjacent ones of said plurality of attachment passages;
providing a sealing device at least partially formed from a third material and positioning said sealing device along one of said first side wall portion of said first end member and said second side wall portion of said second end member;
positioning said first and second end members axially coextensive with one another such that said sealing device is sealingly disposed between axially-coextensive portions of said first side wall portion of said first end member and said second side wall portion of said second end member, such that said first first flange surface portion and said first second flange surface portion are disposed in facing relation to one another, such that said plurality of securement devices are accessible from along said second first flange surface portion of said first flange wall portion and rotationally oriented such that at least one of said plurality of securement devices is disposed between adjacent ones of said plurality of attachment passages, and such that at least one of said plurality of attachment studs extends through a corresponding one of said plurality of attachment passages and beyond said second first flange surface portion; and,
forming a stud head unitarily along said at least one of said plurality of attachment studs by deforming said at least one of said plurality of attachment studs radially outward and axially toward said second first flange surface portion to a second stud length that is less than or equal to said first flange thickness such that said stud head abuttingly engages said second first flange surface portion of said first flange wall portion thereby permanently retaining said first and second end members in an assembled condition.

19. A method according to claim 18, wherein said plurality of attachment studs each extend through and cooperatively engage a corresponding one of said plurality of attachment passages, and forming a stud head unitarily along said at least one of said plurality of attachment studs opposite said second flange wall portion includes forming a stud head unitarily along two or more of said plurality of attachment studs.

20. A method according to claim 19 further comprising capturing said plurality of securement devices between said first and second flange wall portions.

* * * * *